H. PAGE.
DUMPING WAGON.
APPLICATION FILED AUG. 30, 1919.
Patented Oct. 18, 1921.
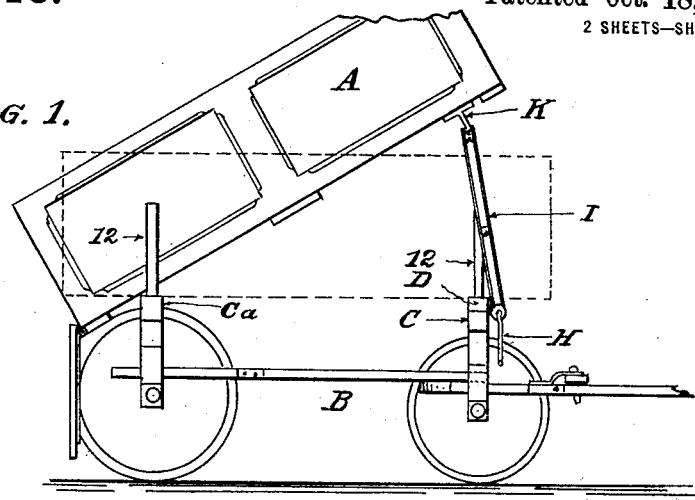
FIG. 1.
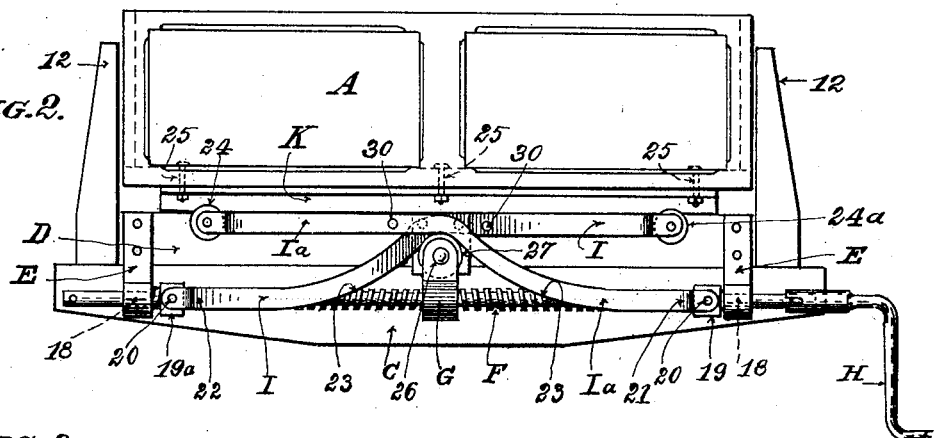
FIG. 2.
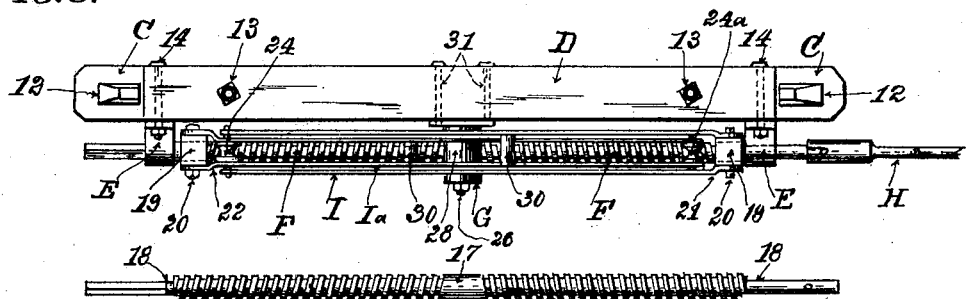
FIG. 3.
FIG. 4.
WITNESS:
Ch. Stark.
INVENTOR:
HARRY PAGE.
BY Michael J. Stark & Sons,
ATTORNEYS.

H. PAGE.
DUMPING WAGON.
APPLICATION FILED AUG. 30, 1919.
1,394,113.
Patented Oct. 18, 1921.
2 SHEETS—SHEET 2.
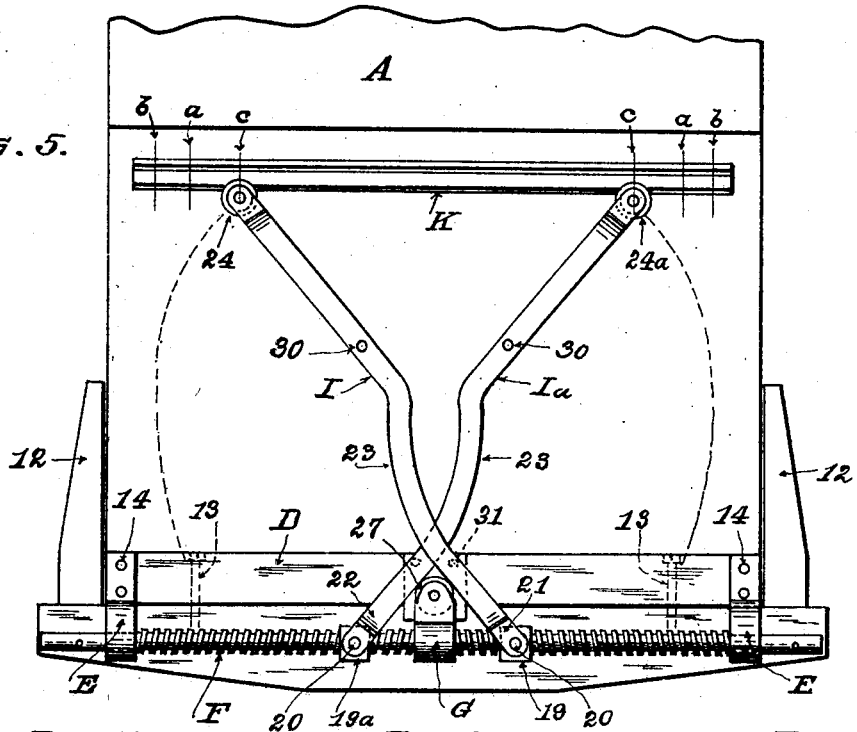
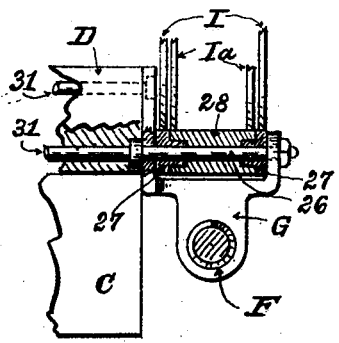
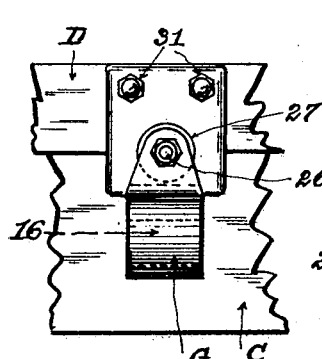
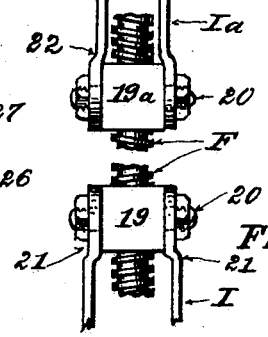
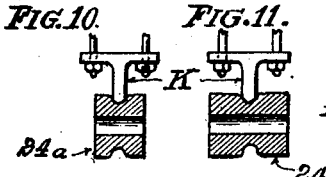
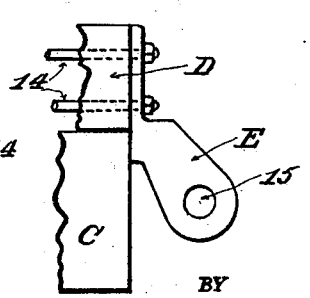
INVENTOR:
HARRY PAGE,
BY Michael J. Stark & Sons
ATTORNEYS.
WITNESS:
Al. Stark.

UNITED STATES PATENT OFFICE.

HARRY PAGE, OF NEWARK, ILLINOIS.

DUMPING-WAGON.

1,394,113.  Specification of Letters Patent.  Patented Oct. 18, 1921.

Application filed August 30, 1919. Serial No. 320,768.

*To all whom it may concern:*

Be it known that I, HARRY PAGE, a citizen of the United States, and resident of the village of Newark, in the county of Kendall and State of Illinois, have invented certain new and useful Improvements in Dumping-Wagons; and I do hereby declare that the following description of my invention, taken in connection with the accompanying sheets of drawings, form a full, clear, and exact specification which will enable others skilled in the art to which the said invention appertains to make and use the same.

This invention has general reference to dumping wagons; and it consists, essentially, in the novel and peculiar combination of parts and details of construction, as hereinafter first fully set forth and described, and then pointed out in the claims.

The object of this invention is the production of an efficient, serviceable, and comparatively inexpensive mechanism for tilting the box of a wagon or similar vehicle, to discharge the contents of said box by gravity, which mechanism, while suitable for application to wagons, trucks, and other load-carrying vehicles in general, is especially well adapted for use on farm wagons, and particularly that class of farm wagons on which a box is removably placed upon the vehicle.

It is very desirable that this class of farm wagons can be converted into a dumping wagon so as to save to the farmer the expense of purchasing a dumping wagon for which there is, generally only a limited use, and which is not suitable for general farm work, such as hauling lumber, timber, and other similar articles and supplies which can be readily carried upon a farm wagon having a removable box carried upon the bolsters, and confined between the stakes extending from these bolsters.

To convert such a wagon into a dumping wagon, I provide this vehicle with mechanism by which the front end of the wagon box can be readily lifted to such a height, and the box tilted to such an angle that the load carried in the box, such as sand, gravel, coal, potatoes in bulk, etc., will be discharged automatically by gravity. This inclination may vary with different goods, but will be sufficient if the angle of inclination is approximately 35 degrees, which is more than the angle of repose or friction of this class of material.

In the drawings, which illustrate the preferred embodiment of my invention, and form a part of this specification—

Figure 1 is an outline side elevation of a farm wagon to which my invention is applied, the wagon box being shown in tilted position, details of construction illustrated in other figures, being omitted. Fig. 2 is an end elevation and showing the wagon box in normal position. Fig. 3 is a plan view of the forward wagon-bolster to which my lifting device is applied. Fig. 4 is a plan of the lifting or operating screw detached. Fig. 5 is a front elevation of the lifting mechanism as applied to the forward bolster and showing the wagon box in tilted position. Fig. 6 is a detail view of the center bearing for the screw-spindle and the links which form a part of this mechanism. Fig. 7 is an end elevation of the same, partly in section. Figs. 8 and 9 are detached views of portions of the screw-spindle, the nuts thereon, and a fragment of the links connected to these nuts. Figs. 10 and 11 are detached detail views of the rollers at the ends of the links and the rail on which these rollers are constructed to run. Fig. 12 is a detail end view of one of the outer bearings for the screw spindle.

Like parts are designated by the same characters and symbols of reference in all of the various figures.

A, in these drawings indicates the usual farm wagon box; and B, the running gear of the wagon. Upon this running gear there are mounted the usual bolsters C, C$^a$. In order to apply my invention to this vehicle I locate upon the forward bolster C, between the stakes 12, a false, or auxiliary bolster D, of preferably the same width as the bolster proper, and when desired and found necessary, removably secure this auxiliary bolster to the bolster proper by screws 13, or other suitable means. To the forward face of the auxiliary bolster D, and at the ends thereof I secure, preferably by bolts 14, bearing brackets E, shown detached in Fig. 12, said brackets having each a smooth, transverse bore 15, serving as a bearing for the screw spindle F, to be hereinafter described.

Medially of the auxiliary bolster D, I secure to the forward face of the said bolster D, preferably by bolts 31, a bearing bracket G, shown detached in Figs. 6 and 7, said bracket having a smooth bore 16, for the passage of the screw spindle F. This screw spindle has in its middle a smooth journal 17, and at its extremities reduced journals 18, the journal 17 engaging the bearing 16 in the middle bracket G, and the journals 18 rotating in the bearings 15 of the end brackets E.

The journals 18 are extended so that their terminals reach approximately to the ends of the bolster C; and at one or both ends of the screw spindle F, there is removably mounted a crank H, by which the screw spindle may be rotated.

The screw spindle F is screw-threaded from the central journal 17 to the end journals 18, the thread at one side of the central journal being a right hand, and that at the other side of said journal a left hand screw-thread, which screw-threads may be either flat, or V-threads, as desired.

Upon this screw spindle F there are mounted nuts 19, 19ª, each of which has oppositely-extending pivots or trunnions 20, upon which there are rotatably mounted at one of their ends, links I, Iª. These links are of peculiar construction, each being comprised of two members in spaced apart relationship, which are, approximately medially of their length, connected by spacers 30.

The extremities of these members of the link I, which connects with the nut 19, are outwardly cranked or offset, as shown at 21, while the corresponding ends of the link Iª, are inwardly offset, as at 22, whereby the latter link may pass between the members of the link I, as best illustrated in Fig. 5. These links have curved portions 23, which perform the function of cams, as it were, in a manner hereinafter to be described. At the free ends of the links I, Iª, there are mounted grooved rollers 24, 24ª, the former being for the link I, and the latter for the link Iª. These rollers are constructed to travel on the stem of a T-iron bar or track K, which track is transversely placed near the forward end of the wagon box, and preferably bolted thereto by bolts 25, shown in Fig. 2.

The bearing brackets for the screw-spindle F project from the auxiliary bolster D a sufficient distance to afford bearings for the curved portions 23 of the links I, Iª, and in order to reduce friction as much as possible, there are mounted upon a journal bolt 26, extending from the face of the auxiliary bolster, preferably three rollers, of which two, viz., the outside rollers 27, serve the members of the link I, while the middle roller 28, performs the same function for the members of the link Iª, this construction being desirable in view of the fact that the actions of the links upon the bracket G, are in opposite directions.

The operation of this mechanism is substantially as follows: The wagon box A is mounted upon the two bolsters C, Cª, and extends beyond the same for some distance, and is guided by the stakes 12, so that the box may rotate on the rear bolster Cª. The track K for the links is placed forward of the forward bolster, in vertical alinement with the axis of the screw-spindle when the box is in normal position. In this normal position, the links are in the position shown in Fig. 2; but when the screw spindle F is being rotated by the crank H, the nuts 19, 19ª, which are normally near the ends of the screw spindle, move toward each other, and with them the links I, Iª. The curved portions 23 of these links, riding upon the rollers 27, 28, of the center bearing-bracket G, force the terminals of the links which carry the track-rollers 24, 24ª, upwardly, and thereby lift the front end of the box. The vertical path described by these rollers is a curve, as indicated in dotted lines in Fig. 5, and starts from the position designated by the lines $a$, $a$, in Fig. 5, outwardly to the lines $b$, $b$, and then inwardly to the lines $c$, $c$, which shows the necessity of rollers at the ends of the links to facilitate this movement.

The terminals of the screw spindle F are constructed to receive the crank H, so that the screw spindle may be rotated from either side of the vehicle, and the crank can be removed from the spindle when not in use.

Attention is now invited to the fact that by removing the auxiliary bolster from the bolster proper, this auxiliary bolster carries with it the entire lifting mechanism excepting the T-rail K, an operation which can be performed in a very short space of time, by removing the fastenings 13. But since this lifting mechanism does not interfere in any manner with the use of the vehicle as a box, or even as a plain stake or lumber wagon, its removal does not become a matter of necessity when converting the vehicle from a box wagon to a stake wagon.

While the description of this mechanism refers specifically to the ordinary farm wagon, it is obvious that the auxiliary bolster, which as a matter of fact, serves primarily as a base for the lifting mechanism, can be used in connection with any other vehicle having a movable wagon box, without change or modification.

I have hereinbefore described with considerable minuteness the preferred embodiment of my invention, but I desire it to be understood that I am aware that changes may be made in the details of construction, and parts omitted, if desired, without departing from the scope of my invention as defined in the appended claims.

Having thus fully described this invention, I claim as new, and desire to secure to myself by Letters Patent of the United States—

1. In a device of the nature described, the combination, with the running gear of a vehicle, of a tiltable wagon box mounted on said running gear, and mechanism for tilting said wagon box, said mechanism including a base, end brackets extending from one side of said base, said end brackets having each a journal bearing, a further bearing bracket medially of said base, said latter bracket having a journal bearing in axial alinement with said end bearings, a screw-spindle rotatably mounted in said bearings, said screw-spindle having a right and a left thread, a nut on each of said threads and in screw-threaded connection therewith, a pair of links pivotally connected at one of their ends to said nuts, a track rail secured transversely to said wagon box and adapted to coöperate with the extremities of said links, said links having curved portions constructed to slide upon the medial bearing bracket, to cause the ends of the links that coöperate with said track rail to move upwardly to tilt said wagon box, as described.

2. In a device of the nature described, the combination, with the running gear of a vehicle, of a wagon box tiltably mounted on said running gear, and mechanism for tilting said wagon box by lifting it at its forward end, said mechanism including a base, a shaft, said shaft having a right and a left thread, said shaft being rotatably connected to said base, a pair of nuts in screw-threaded engagement with said shaft, a pair of approximately S-shaped links pivotally connected to said nuts, and a bearing at the medial portion of said base, said links being supported by said bearing and crossing each other above said bearing, said bearing having anti-friction rollers upon which said links are constructed to move, said links being arranged to coöperate with said wagon box to elevate the same.

3. In a device of the class described, the combination of a wagon frame, a box mounted thereon, means for elevating said box, said means including a threaded shaft having right and left-hand threads, oppositely extending links operatively connected to said threaded shaft and adapted for opposite movement when the shaft is rotated, a portion of said links being curved and the extremities of the links being adapted to underlie said box, and an anti-friction bearing located midway between the extremities of the links and coöperating with the curved portions of the links, said curved portions being so arranged relative to the bearing and the extremities of the links that inward movement of the links under the action of the threaded shaft will cause said curved portions to ride up on said anti-friction bearing and effect the elevation of said box.

In testimony that I claim the foregoing as my invention, I have hereunto set my hand.

HARRY PAGE.